Jan. 9, 1962 A. E. MARTIN 3,015,984
GRATING SPECTROMETERS OR ANALYSERS
Filed Sept. 16, 1957 2 Sheets-Sheet 2
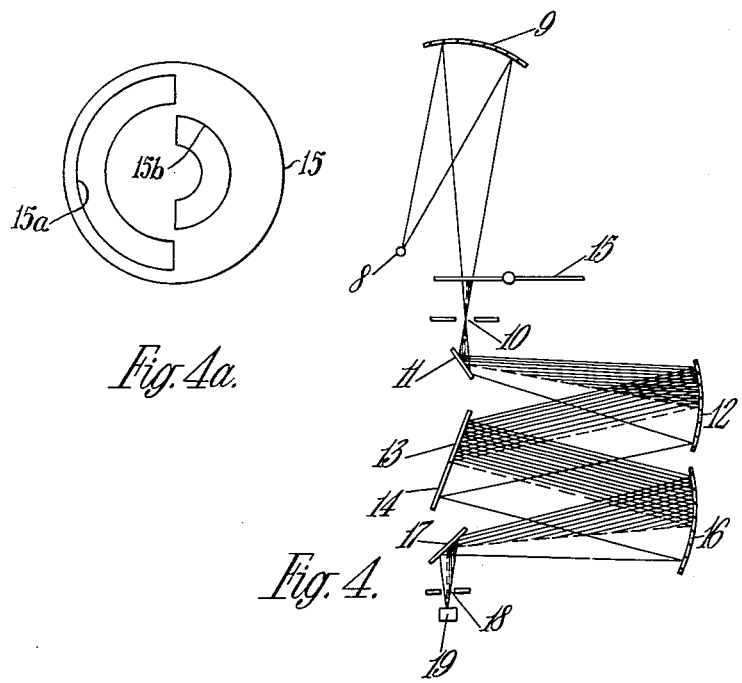
Fig. 4a.
Fig. 4.
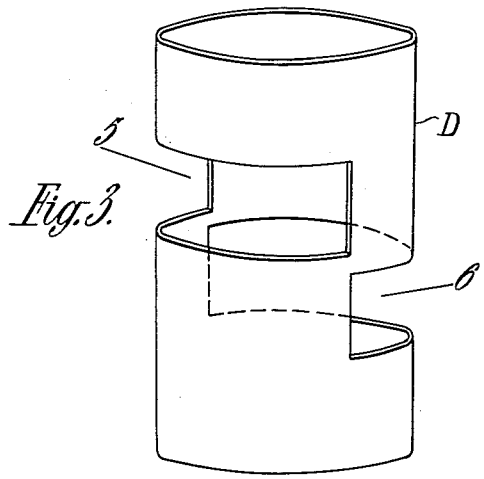
Fig. 3.

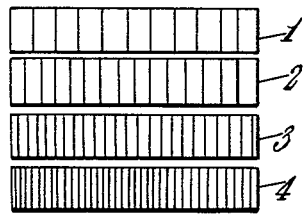
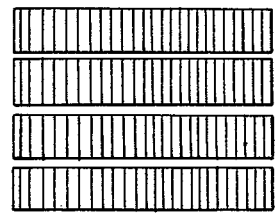
Fig. 1a.   Fig. 1b.
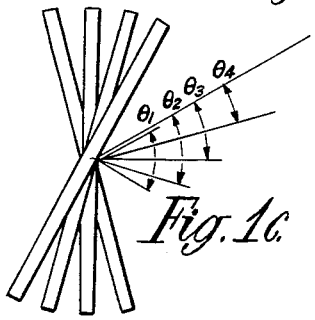
Fig. 1c.
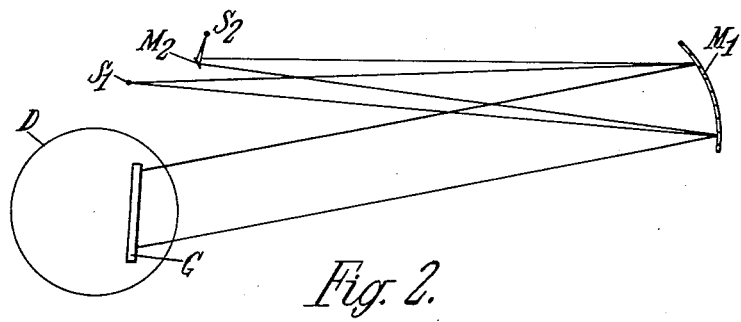
Fig. 2.

United States Patent Office 3,015,984
Patented Jan. 9, 1962

3,015,984
GRATING SPECTROMETERS OR ANALYSERS
Albert E. Martin, Newcastle-upon-Tyne, England, assignor to Sir Howard Grubb Parsons & Company Limited, Newcastle-upon-Tyne, England
Filed Sept. 16, 1957, Ser. No. 684,226
Claims priority, application Great Britain Sept. 21, 1956
12 Claims. (Cl. 88—14)

This invention relates to grating spectrometers or analysers wherein a diffraction grating is used to disperse incident radiation.

When a parallel beam of radiation falls on a plane ruled grating at an angle of incidence $i_1$ rays diffracted at an angle $i_2$ reinforce each other if the following well-known equation is satisfied:

$$d \sin i_1 + d \sin i_2 = n\lambda$$

where $d$ is the grating, spacing, $\lambda$ the wavelength of the particular wavelength under consideration and $n$ the order of the spectrum. This is frequently referred to as the grating equation.

By rotating the grating therefore the wavelengths which reinforce each other for a particular angular position can be collected and the grating thus becomes a means of obtaining selected wavelengths from a main body of radiation impinging on the grating.

In infra-red instruments a Littrow arrangement of a plane grating is commonly used and in this case the grating equation becomes $$2d \sin i = n\lambda$$

where $$i_1 = i_2 = i$$

In designing a grating spectrometer or analyser the basic difficulty is in eliminating overlapping orders in a simple and effective manner. Thus, for example, if the grating is set to $9\mu$ in the first order, it is equally set to 4.5, 3 and $2.25\mu$ in the second, third and fourth orders, respectively. If $9\mu$ is the desired wavelength, the higher orders must be rejected and two methods are commonly employed:

(1) Filters passing the wanted wavelength but rejecting the unwanted ones and (2) a small prism monochromator, employed either before or after the grating passing the desired wavelength only.

Both these methods have disadvantages.

One filter can only operate over a limited spectral range, less than 2:1 in wavelength, since at one end of the range the filter must pass $\lambda$ but reject $\lambda/2$, while at the other end it must pass a wavelength as close as possible to $\lambda/2$.

The prism monochromator is quite satisfactory but the problem remains of keeping the wavelength exactly in step with that of the grating. This difficulty has been satisfactorily solved but the necessary mechanism adds appreciably to the cost of the complete spectrometer.

It is the purpose of the present invention to provide an alternative method of eliminating unwanted spectral orders from a grating which is substantially free from the above-mentioned disadvantages.

The invention consists in a grating spectrometer or analyser comprising a source unit for radiation, a monochromator for dispersing said radiation, radiation detecting means for receiving radiation from said monochromator and producing an electric signal representative of the energy content of said radiation and an A.C. amplifier adapted to receive the electric signals from the detecting means; in which spectrometer, the monochromator has a first plane diffraction grating for dispersing the radiation and at least one additional grating employed for the elimination of at least the second order of diffraction from the said first grating, the arrangement being that the detector receives radiation of wavelengths $\lambda$, $\lambda/2$, $\lambda/3$, etc. from the first said grating alternated with radiation corresponding to the second and higher orders of $\lambda$ ($\lambda/2$ etc.) from the additional grating or gratings so that radiation of the second and higher orders ($\lambda/2$ etc.) is continuously being received by the detector at a substantially uniform energy level whilst radiation of wavelength $\lambda$ is received at regular intervals only thus producing an output in the amplifier proportional to the radiation of wavelength $\lambda$.

Two main arrangements are possible, viz, (a) in which all gratings have the same spacing but the parallel radiation falls on them at different angles of incidence to be defined hereinafter, while in (b) the angle of incidence is the same but the spacing changes from one grating to the next.

In either case suppose that grating No. 1 is set to give wavelengths $\lambda$, $\lambda/2$, $\lambda/3$, $\lambda/4$, etc. in the first, second, third, fourth and higher orders while grating No. 2 is set to give wavelengths $\lambda/2$, $\lambda/4$, $\lambda/6$, $\lambda/8$, etc., then clearly if a periodically controlled shutter is employed to expose grating 1 and cover grating 2 in one extreme position and cover grating 1 and expose grating 2 in the other extreme position, and if matters are arranged so that the energy associated with wavelength $\lambda/2$ is the same for grating 1 as for grating 2, provided that as one grating is obscured the second one is exposed to a proportionate extent, the total energy of wavelength $\lambda/2$ will remain constant. If the radiations from the gratings are focussed on a detector which produces an electric signal and the resultant signal is passed through an A.C. amplifier no output corresponding to wavelength $\lambda/2$ will be obtained, since no alternating component of this wavelength is present in the input to the amplifier.

Wavelength $\lambda$ from grating No. 1 only is of course chopped normally by suitable means e.g. as described hereinafter with 50% cut-off time, so that this signal will be amplified and the output can be recorded or used in any desired manner. Thus by the means described $\lambda/2$ may be eliminated without the use of either a prism monochromator or a filter.

We are still left, however, with the higher orders, $\lambda/3$ etc. but these can be removed by using additional gratings, as will now be described with reference to the accompanying diagrammatic drawings in which, FIGURE 1a shows four gratings each having different line spacing;

FIGURE 1b shows four gratings each having the same spacing but inclined at different angles to one another;

FIGURE 1c shows a plan view of the grating arrangement of FIGURE 1b, and

FIGURE 2 shows a monochromator incorporating the invention.

FIGURE 3 shows a form of shutter suitable for use with two gratings disposed as shown in FIGURE 1a or 1b.

FIGURE 4 shows an alternative arrangement to that shown in FIGURE 2 and

FIGURE 4a illustrates a suitable form of chopper device for use in connections with the arrangement of FIGURE 4.

In carrying the invention into effect in one form by way of example, it will be assumed for the purpose of explanation that grating No. 1 is set to $\lambda$ and grating No. 2 is set to $\lambda/2$, grating No. 3 set to $\lambda/3$ and grating No. 4 set to $\lambda/5$. A shutter is then arranged to expose gratings 2, 3 and 4 together while obscuring grating No. 1 and vice versa. As has already been explained $\lambda/2$ is eliminated and provided that the relative intensities are adjusted correctly, the same amount of radiation of wavelength $\lambda/3$ will fall on the exit slit from grating No. 1 as from grating No. 3 and no alternating signal will be passed to the amplifier.

λ/4 is automatically eliminated to a large extent by grating No. 2 and λ/5 is eliminated by grating No. 4. λ/6 will be present from grating No. 1 or from gratings 2 and 3 together, so that in general a perfect cancellation of λ/6 will not be possible without using a further grating. Still higher orders λ/7, etc. will also require additional gratings if complete elimination is desired.

In many cases λ/6 and higher orders will not interfere appreciably, since the diffracted energy at shorter wavelengths falls off rapidly as one departs from the preferred angle (blaze angle) of the grating. In cases where the higher orders do interfere a filter may be required, but since when λ=15μ, λ6=2.5μ, all that is required is a filter which rejects wavelengths below 3μ and this can easily be met by means of an F-centre filter, interference-type filter, or a filter of lead sulphide or lead telluride.

If the arrangement shown in FIGURE 1a is employed, the grating spacing is progressively reduced from $d$ (grating 1) to $d/2$ (grating 2), $d/3$ (grating 3) and $d/5$ (grating 4). From the grating equation $2d \sin i = n\lambda$, where $i$ is the agle of incidence, $i$ is the same for all gratings and the wavelength in the first order will have the values λ, λ/2, λ/3 and λ5. By using rotating drum D, see FIGURES 2, 3 which rotates about a vertical axis and which is slotted to allow radiation to reach alternately grating No. 1 or grating 2, 3 and 4 together, cancellation of the higher orders from grating No. 1 up to λ/5 is achieved provided that the intensity of the radiation diffracted from the various gratings is suitably adjusted, and exposure of one grating (or set of gratings) starts just as radiation on the other grating (or set of gratings) begins to diminish, the time of exposure in each case being equal to the time of obscuration.

In FIGURE 1(b) the grating spacing $d$ is the same for all gratings but the angles of incidence FIG. 1(c) $\theta_1$ $\theta_2$, $\theta_3$ and $\theta_4$ are chosen so that $2d \sin \theta_1 = \lambda$, $2d \sin \theta_2 = \lambda/2$. $2d \sin \theta_3 = \lambda/3$ and $2d \sin \theta_4 = \lambda/5$. Cancellation of the higher orders from grating No. 1 follows exactly as before. It is not essential for the grating spacings to conform exactly to the arrangements shown in FIGURES 1(a) or 1(b) and any spacings $d1$, $d2$, $d3$ and $d4$ can be employed provided that:

$$2d_1 \sin \theta_1 = \lambda$$
$$2d_2 \sin \theta_2 = \lambda/2$$
$$2d_3 \sin \theta_3 = \lambda/3$$

and $2d_4 \sin \theta_4 = \lambda/5$, where $\theta_1$, $\theta_2$, $\theta_3$ and $\theta_4$ are the respective angles of incidence.

Referring more particularly to FIGURE 2, $S_1$ is an entrance slit of the monochromating part of the instrument on to which a beam of infra-red radiation is focussed while $M_1$ is a collimating mirror, usually an off-axis paraboloid. A parallel beam of radiation is directed on to the grating assembly G and the diffracted beam returns practically along the same path to $M_1$ and is focussed via the small plane mirror $M_2$ on to an exit slit $S_2$. Further, optical arrangements other than that shown in FIGURE 2 can be employed, and, for example, the Ebert system in which the paraboloid is replaced by two spherical mirrors is frequently used.

In FIGURE 3 a form of shutter D is shown which is suitable for use with two gratings which can be arranged either in the form shown in FIGURE 1a or FIGURE 1b. The slots 5 and 6 are arranged so that each grating is exposed alternately. If more gratings are used the slot 6 would be enlarged in the vertical direction to expose all the secondary gratings together.

FIGURE 4 shows an alternative optical arrangement wherein radiation from a source 8 is focussed by mirror 9 on to the entrance slit 10 of the monochromator. The radiation passing through the slot 10 is then focussed by means of mirrors 11 and 12 on the gratings 13 and 14 which have different line spacings, the spacing of grating 14 being twice that of grating 13, and are arranged side by side instead of one above the other as in FIGURE 1. By means of a chopper 15 the shape of which is shown in FIGURE 4a the beam of radiation is split by means of slots 15a, 15b, so that approximately half falls on grating 13 and the other half on grating 14 but such that when gating 13 is exposed to radiation grating 14 is cut off and vice versa. More gratings can be arranged side by side if higher orders than the second are to be eliminated provided the chopper 15 is modified so as to permit grating 13 on the one hand and gratings 14 etc. on the other to be exposed alternately.

After diffraction at the gratings the rays are focussed by mirrors 16 and 17 on to exit slit 18 and hence on to the detector and A.C. amplifier 19.

The arrangement of FIGURE 4 can also be used where the gratings have the same line spacing but are disposed at different angles to the incident radiation.

In either case the wavelengths of the cancelling radiations, for example λ/2 (second order from grating 14 and first order from grating 13), can be conveniently adjusted to exact equality by arranging one or both of the collimating mirrors 12, 16 so that the effective angles of incidence are slightly different. This can be achieved for example by splitting each mirror 12, 16 into two separate mirrors with a small space between them. This adjustment can also be effected if only one collimating mirror is employed as for example in a Littrow arrangement.

In the general case, which is applicable to any optical system, if $i_1$ is the angle of incidence and $i_2$ the angle of diffraction, $$d(\sin i_1 + \sin i_2) = 2d \sin \left(\frac{i_1 + i_2}{2}\right) \cos \left(\frac{i_1 - i_2}{2}\right) = n\lambda$$

where $n$ is the order of the spectrum. Since $$\cos \left(\frac{i_1 - i_2}{2}\right)$$

is constant for any given monochromator and $i_1$ and $i_2$ increase or decrease together as the grating is rotated, the equation has exactly the same form as for the true Littrow arrangement and all the previous considerations apply provided that the grating spacing $d$ is replaced by $$d \cos \left(\frac{i_1 - i_2}{2}\right)$$

and the angle of incidence is replaced by $$\left(\frac{i_1 + i_2}{2}\right)$$

In one form of the invention it is applied to self-balancing spectrometers and gas analysers both of direct deflection and self-balancing type, and by way of an example a double-beam spectrometer may be provided in which a beam of radiation passes alternately through a sample and reference cell before being focussed on the slit of the grating spectrometer already described.

If A and B represent the energy of wavelength λ passing through the reference cell and sample, respectively, and C and D represent the energy corresponding to a higher order of the grating (say λ/2) passing through the reference cell and sample, respectively, then the energy entering the slit of the monochromator can be represented by $$\left(\frac{A+B}{2}\right) + \left(\frac{A-B}{2}\right) \sin wt$$

and $$\frac{C+D}{3} + \frac{C-D}{2} \sin wt$$

for the two wavelengths, where $w = 2\pi f$ and $f$ is the frequency of beam switching. Of course these expressions may not be strictly true since they assume sinusoidal beam switching, and in practical cases it is necessary to include higher harmonics, $2f$, $3f$ etc., but the argument is in no way affected by ignoring these terms as will be explained hereinafter. Similarly the chopping action at frequency F which is necessary to eliminate λ/2, etc. in the grating monochromator in the manner described herein can be represented by the expression ½(1+sin $pt$), where $2\pi F=p$, so that the energy of wavelength λ ultimately falling on the radiation detector of the spectrometer may be represented by the expression $$\frac{1}{2}\left[\frac{A+B}{2}+\frac{A-B}{2}\sin wt\right](1+\sin pt)=\frac{(A+B)}{4}$$
$$+\frac{(A-B)}{4}\sin wt+\frac{(A+B)}{4}\sin pt+\frac{A-B}{4}\sin wt \sin pt$$

The constant term will of course be ignored by an A.C. amplifier used in conjunction with the radiation detector and the amplification of the various alternating signals will depend on the frequency characteristic of the amplifier. It is necessary for the two frequencies $f$ and F to be related such that $F=kf$, where $k$ is a constant; also both frequencies must be derived from a common supply, e.g. A.C. mains, so that a fixed phase relationship can be assumed.

The term $$\frac{A-B}{4}\sin wt \sin pt=\frac{A-B}{8}[\cos(p-w)t-\cos(p+w)t]$$

so that four frequencies are present, viz, $f$, F, $F-f$ and $F+f$. Provided that $F-f$ is sufficiently removed from $f$ and F, so that it can be preferentially amplified by tuning the amplifier to this frequency, a signal proportional to $A-B$ can be obtained and used to drive a servo motor which controls the position of a balancing attenuator in the reference beam in a manner well known to those versed in the art. The frequency $F+f$ could equally well be used but is less useful since the detector responds best to lower frequencies.

Now energy of wavelength λ/2 ultimately falling on the detector is proportional to $$\frac{1}{2}\left[\frac{C+D}{2}+\frac{C-D}{2}\sin wt\right]$$

provided that the chopping action is eliminated as already described by arranging the energy from grating No. 1 to be equal to that obtained from grating No. 2. Thus a signal at frequency $f$ is obtained which as already stated is clearly distinguishable from the chosen frequency $F-f$ or $F+f$. Thus the absorption of wavelength λ/2 is completely ignored and only the absorption of wavelength λ affects the position of the balancing attenuator, except for interference from higher orders which are not effectively cancelled as already described.

The employment of more complicated expressions for the beam switching and chopping functions does not affect the above argument, since all that will happen is that additional terms involving $2w$, $2p$ and still higher harmonics and combination frequencies will be involved. All that is necessary is to arrange that the working frequency $F-f$ or $F+f$ does not coincide with any of these higher frequencies or with the corresponding sum and difference values.

While it has been assumed that the beam switching device precedes the granting monochromator, this is not essential and the order can be reversed if desired.

I claim:

1. In a grating spectrometer or analyser comprising a source unit for radiation, a monochromator for dispersing said radiation and traversing said dispersed radiation across an exit slit thereof, radiation detection means receiving the dispersed radiation from said exit slit and producing an electrical signal representative of the energy content of said radiation and an amplifier responsive to A.C. signals only and receiving signals from the detecting means, the provision in the monochromator of a plurality of plane diffraction gratings for dispersing said radiation, said gratings comprising a first grating from which radiation of wavelength λ and the higher orders thereof is focused on the exit slit and at least one additional grating from which the exit slit receives radiation of wavelength of higher orders of wavelength λ, namely λ/2, λ/3, etc., means being provided to transmit radiation to the exit slit alternately from said first grating and from the other gratings whereby said slit receives radiation of wavelength λ, λ/2, λ/3 etc. alternated with radiation of wavelength λ/2, λ/3 etc. and the detection means produces an alternating output proportional to radiation of wavelength λ only.

2. A grating spectrometer or analyser in accordance with claim 1 in which the gratings have different line spacings but are arranged each at the same angle to the incident radiation.

3. A grating spectrometer or analyser in accordance with claim 1 in which the gratings have equal line spacings but are arranged so that the angle of incidence of radiation is different for each grating.

4. A grating spectrometer or analyser in accordance with claim 2 in which the gratings are arranged vertically one above the other.

5. A grating spectrometer or analyser in accordance with claim 3, in which the gratings are arranged vertically one above the other.

6. A grating spectrometer or analyser in accordance with claim 2 in which the gratings are arranged side by side.

7. A grating spectrometer or analyser in accordance with claim 3, in which the gratings are arranged side by side.

8. A grating spectrometer or analyser in accordance with claim 4 in which the means whereby the radiation from the first grating is caused to alternate with radiations from at least one other grating falling on the detection means, comprise a rotary shutter device rotating about a vertical axis and having two apertures which are diametrically opposed but in different planes so that as the shutter rotates one aperture exposes the first grating whilst each such additional grating is obscured and then the other aperture exposes each such additional grating whilst the first grating is obscured.

9. A grating spectrometer or analyser in accordance with claim 6 in which the radiations are interrupted before they reach the gratings by means of a shutter which cuts off part of radiation in such a way that whilst the first grating is being exposed to radiation the radiation directed onto each such additional grating is cut off and vice versa.

10. A grating spectrometer or analyser in accordance with claim 6, in which the radiations are interrupted after they reach the gratings by means of a shutter which cuts off part of radiation in such a way that whilst the first grating is being exposed to radiation the radiation directed onto each such additional grating is cut off and vice versa.

11. A grating spectrometer or analyser in accordance with claim 9 in which the shutter comprises a disc having arcuate apertures which are disposed at different radii.

12. A grating spectrometer or analyser inn accordance with claim 1 in which collimating means in the monochromator comprises mirrors each projecting a parallel beam of radiation onto a grating and arranged so that small variations in the angle of incidence or diffraction on or from the grating can be made.

References Cited in the file of this patent

UNITED STATES PATENTS

| | | |
|---|---|---|
| 1,996,233 | Darrah | Apr. 2, 1935 |
| 2,453,161 | Swings | Nov. 9, 1948 |
| 2,631,489 | Golay | Mar. 17, 1953 |
| 2,679,185 | Atwood | May 25, 1954 |
| 2,743,646 | Strong | May 1, 1956 |
| 2,836,096 | Korman | May 27, 1958 |